H. E. BLOOMER.
CONVERTIBLE METER BOX.
APPLICATION FILED MAY 22, 1916. RENEWED FEB. 28, 1919.

1,316,218.
Patented Sept. 16, 1919.

UNITED STATES PATENT OFFICE.

HARVEY E. BLOOMER, OF MILWAUKEE, WISCONSIN, ASSIGNOR, BY MESNE ASSIGNMENTS, TO APPLETON ELECTRIC COMPANY, OF CHICAGO, ILLINOIS, A CORPORATION OF ILLINOIS.

CONVERTIBLE METER-BOX.

1,316,218.     Specification of Letters Patent.    Patented Sept. 16, 1919.

Application filed May 22, 1916, Serial No. 99,073. Renewed February 28, 1919. Serial No. 279,880½.

*To all whom it may concern:*

Be it known that I, HARVEY E. BLOOMER, a citizen of the United States, and resident of Milwaukee, in the county of Milwaukee and State of Wisconsin, have invented certain new and useful Improvements in Convertible Meter-Boxes; and I do hereby declare that the following is a full, clear, and exact description thereof.

The present invention relates to new and useful improvements in casings or boxes for housing electrical connections, and the invention is more particularly directed to the provision of a box or casing for housing the electrical connections associated with electric meters, although various features of the invention may be as well employed in boxes for housing other electrical connections.

In connection particularly with electric meters it is desirable under various conditions to position the box for holding the fuses or other connections in different positions relative to the meter and various other conditions are met with in individual instances necessitating boxes of different types. It is the present custom to make separate boxes or casings to meet these numerous conditions and as a result jobbers must of necessity have in stock an undesirably large number of meter boxes to meet the various conditions encountered.

It is therefore the object of the present invention to provide a meter box which is adaptable for various conditions of use and having various parts interchangeable so that the same box may be positioned above or below or to either side of a meter and may be adapted for various differing connections in such manner as to nevertheless afford the necessary protection to the connections and fuses contained therein.

A further object of the invention resides in the provision of such a box or casing having wall portions which may be readily interchanged or substituted to adapt the box to the specific use for which it is intended, and it is further an object to provide such a box of relatively simple structure whereby it may be manufactured at a cost but a little if any greater than the cost of the individual types of boxes which are now used.

With the above and other objects and advantages in view the invention resides more particularly in the novel combination, arrangement and formation of parts more particularly hereinafter described and more particularly pointed out in the appended claims.

Figure 1:
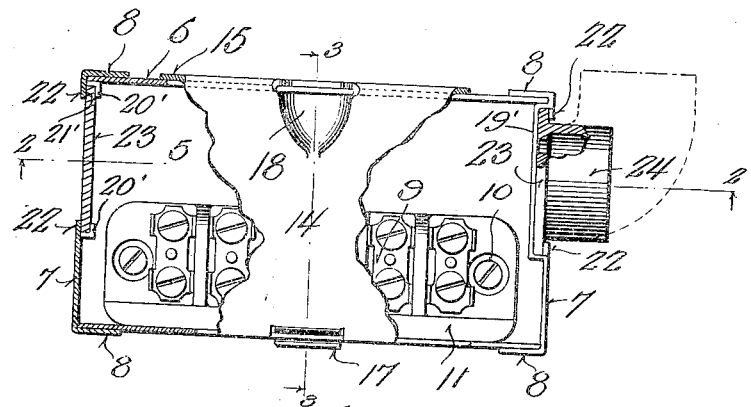
Figure 1 is a plan view of a meter box constructed in accordance with the present invention, and having portions of the cover and its walls broken away to more clearly disclose the structure.
Figure 2:
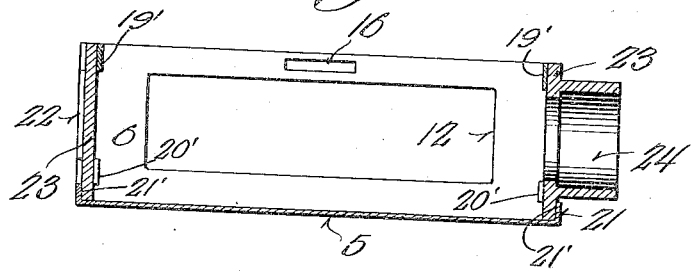
Fig. 2 is a sectional view taken longitudinally through the box on the line 2—2 of Fig. 1.
Figure 3:
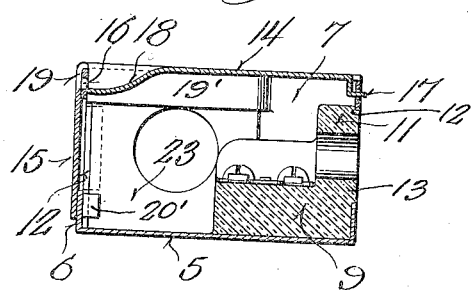
Fig. 3 is a transverse sectional view through the box on the line 3—3 of Fig. 1, and showing the means for securing the cover in place.
Figure 4:
Fig. 4 is an end view of the box.

Referring now more particularly to the accompanying drawings, the body of the box is preferably stamped from a single sheet of metal and includes the bottom 5, the side walls 6 and the end walls 7 having flanges 8 at their side edges which are bent around and secured to the side walls.

Meter boxes of this type are adapted to receive insulation blocks 9 secured to the bottom of the box by screws 10 and including an upstanding ported wall portion 11 through which the individual sets of wires may project.

The block is positioned in the meter box with its wall 11 adjacent whichever side of the box it is desired to project the wires and to permit this a longitudinal slot 12 is provided in each side thereof and adapted to receive an elongated boss 13 on the outer face of said wall 11. Inasmuch as only one insulation block is usually employed it is necessary to provide means for closing the slot 12 of that wall of the box other than the wall with which the insulation block is associated, and to accomplish this a cover plate 14 is provided for the box and has one side bent to provide a depending wall portion 15 adapted to fit over the slot of a respective side wall. For securing this cover plate in place, each side wall 6 is provided above its slot 12, and adjacent its upper edge with a slot 16, and the central portion of the free side edge of the cover plate is provided with a depending tongue 17 having its lower portion outwardly directed and adapted to fit into a respective slot, the tongue being projected downwardly from a point inwardly of the edge of the upper plate, whereby when secured, the edge of the cover plate may overlie the top edge of a respective side wall. The central portion of the side edge of the cover plate adjacent the wall 15 is offset downwardly at 18 and the adjacent portion of the wall 15 correspondingly cut away at 19 to expose the slot 16 of the respective side wall whereby a keeper member preferably of wedge shape may be passed therethrough to thus firmly lock the cover on the box, in conjunction with the securing tongue 17. A simple fastening means for the cover has thus been provided which permits it to be turned as desired to position its depending wall portion 15 selectively over either of the slots of the side walls. To provide for the introduction of a cable or other conductor into either end or both ends of the box each of the end walls has its major portion inwardly offset and apertured, this offset extending from the top of the wall as at 19' and terminating short of the bottom of the wall as at 20' and spaced from the bottom portion 5 of the wall to form a slot 21' at its lower end and to define a holding flange 21 at said bottom portion. Extending inwardly of this offset portion from its side portions are tongues 22, and by this structure a holding means is provided for interchangeable end plates 23 which may form a complete closure as shown as on end of the box, or may carry a nipple 24 as shown at the other end of the box and this nipple may be either straight as shown in full lines or in the form of an elbow as shown in dotted lines. It is noted that inasmuch as the interchangeable end plates are disposed inwardly of the end planes of the box, they are held in position by the cover of the box. To insure a more positive holding of the end plates, particularly when the cover is removed, a screw 25 is preferably passed through each of the plates and engaged in the offset of the end wall, although this arrangement is not essential.

The function of this positive contact of the interchangeable plates with the box body is that should a contact be accidentally made between a wire of the conduit and the plate, and should the box body contact with a pipe or other metallic member, a free passage of current would be insured to thus obviate the possibility of heat being generated by imperfect contact between the interchangeable plate and the box body, it being understood that the end plate may be enameled, or otherwise provided with a finish.

Inasmuch as the nipple carrying interchangeable plate 23 is detachably connected with the box body, a ready means of securing the end of a conduit to the box is procured inasmuch as the plate may be screwed on to the end of a conduit and then inserted in the box, the interchangeable plate thus providing in addition to a means for closing the end of the box also as an attaching fitting for the end of the conduit.

I claim:

1. A box for housing electrical connections comprising a body having similar openings in two of its sides and a reversible cover having a flange for lapping either of said sides and closing the opening therein, and means for holding the cover in position; in combination with an electrical connection comprising an insulating block placeable in the box adjacent either of said sides and having a flange arranged to close the opening in the other of said sides, the flange of said block being formed with wire holes therethrough, substantially as and for the purpose described.

2. A box for housing electrical connections comprising a body having similar openings in two of its sides and a reversible cover having a flange for lapping either of said sides and closing the opening therein, the box and the cover having slots and tongues arranged to interlock in either position of the cover; in combination with an electrical connection comprising an insulating block placeable in the box adjacent either of said sides and having a flange arranged to close the other of said sides, the flange of said block being formed with wire holes therethrough, substantially as and for the purpose specified.

3. A box for housing electrical connections including a body having permanent bottom, side and end walls, and a removable cover, two of the walls of the box having similar openings therethrough, and the cover being reversible and having a depending flange arranged to lap either of the walls formed with openings and close the opening therein; in combination with an electrical connection comprising an insulating block placeable in the box adjacent either of the walls formed with said openings and having a flange arranged to close the opening in the other of said walls, the flange having wire holes therethrough, substantially as and for the purpose set forth.

4. A box for housing electrical connections provided with an opening in one side wall and with slots in the upper edges of its side walls, a cover for the casing, a depending wall portion at one side edge of the cover, and means carried by the cover for selectively engaging said slots.

5. A box for housing electrical connections provided with openings in its side walls and with tongue receiving apertures in the upper edges of its side walls, a cover for the casing, a depending wall portion at one side edge of the cover, a tongue on the free side edge of the cover selectively engageable with one of the apertures and the other side edge of the cover having an offset portion adapted to expose the other aperture.

6. A box for housing electrical connections having portions of its end walls inwardly offset and provided with openings, tongues projecting across the offset portion and closure plates adapted to slide between the tongues and offset portions to be thus secured to the box, conduit attaching means carried by at least one of said plates, and a screw passed through said plate and into the body casing.

7. A box for housing electrical connections having portions of one end wall offset and provided with an opening, tongues projecting across the offset portion, a closure plate slidable between said tongues and the offset portion, a cover for said box, said cover being disposed over the outer edge of said closure plate to prevent the removal thereof, and means for securing said cover to the box.

8. The combination with an insulating block adapted to provide connections for electrical wires, said block having a boss formed on one side, of a casing for housing said block and provided in one side wall with a longitudinal slot to receive said boss, an offset portion in one end wall of the casing provided with an opening, tongues projecting across the offset portion, a closure plate slidable between the tongues and the offset portion, a cover for the casing disposed over the outer edge of said closure plate to prevent the removal thereof, a depending wall portion at one side edge of the cover for closing said longitudinal slot, and means for retaining said cover in place.

In testimony that I claim the foregoing I have hereunto set my hand at Milwaukee, in the county of Milwaukee and State of Wisconsin, in the presence of two witnesses.

HARVEY E. BLOOMER.

Witnesses:
 FRANK S. RATCLIFFE,
 M. E. DOWNEY.